(12) United States Patent
Wang et al.

(10) Patent No.: US 12,481,839 B2
(45) Date of Patent: Nov. 25, 2025

(54) SYSTEM AND METHOD FOR LAYOUT-AWARE GENERATIVE PRETRAINING FOR VISUALLY RICH DOCUMENT UNDERSTANDING

(71) Applicant: JPMorgan Chase Bank, N.A., New York, NY (US)

(72) Inventors: Dongsheng Wang, London (GB); Natraj Raman, London (GB); Mathieu Sibue, New York, NY (US); Zhiqiang Ma, Short Hills, NJ (US); Petr Babkin, San Francisco, CA (US); Simerjot Kaur, Jersey City, NJ (US); Yulong Pei, Eindhoven (NL); Armineh Nourbakhsh, Pittsburgh, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 179 days.

(21) Appl. No.: 18/540,093

(22) Filed: Dec. 14, 2023

(65) Prior Publication Data
US 2025/0200292 A1 Jun. 19, 2025

(51) Int. Cl.
*G06F 40/40* (2020.01)
*G06V 30/19* (2022.01)
*G06V 30/412* (2022.01)
*G06V 30/413* (2022.01)

(52) U.S. Cl.
CPC ........ *G06F 40/40* (2020.01); *G06V 30/19147* (2022.01); *G06V 30/412* (2022.01); *G06V 30/413* (2022.01)

(58) Field of Classification Search
None
See application file for complete search history.

(56) References Cited

U.S. PATENT DOCUMENTS

| | | | |
|---|---|---|---|
| 11,516,158 B1 * | 11/2022 | Luzhnica | G06F 40/35 |
| 2021/0232773 A1 * | 7/2021 | Wang | G06F 18/21 |
| 2023/0367972 A1 * | 11/2023 | Zhao | G06V 20/70 |

\* cited by examiner

*Primary Examiner* — Antim G Shah
(74) *Attorney, Agent, or Firm* — Greenblum & Bernstein, P.L.C.

(57) ABSTRACT

Various methods and processes, apparatuses/systems, and media for performing spatial-aware reading for visual documents are disclosed. A processor implements a language model; modifies existing parameters and architecture of the language model to incorporate new parameters in its architecture by integrating a disentangled spatial attention process to the language model; pretrains the modified model by performing an autoregressive block infilling process on a plurality of document pages thereby training the new parameters and further adjusting the existing parameters; instruction-tunes the pretrained model on data derived from a plurality of visually rich document understanding datasets to teach the pretrained model to follow document-oriented instructions or answer questions about documents by leveraging their content and their spatial layout and outputting a trained model; and performs spatial-aware reading for visual documents by utilizing the trained model.

17 Claims, 9 Drawing Sheets

SYSTEM AND METHOD FOR LAYOUT-AWARE GENERATIVE PRETRAINING FOR VISUALLY RICH DOCUMENT UNDERSTANDING

TECHNICAL FIELD

This disclosure generally relates to data processing, and, more particularly, to methods and apparatuses for implementing a platform, language, cloud, and database agnostic layout-aware generative module configured to perform spatial-aware reading for visual documents.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

At present, no existing Large Language Models (LLMs), including chat Generative Pretrained Transformer (ChatGPT), Generative Pretrained Transformer 4 (GPT4), Open Pretrained Transformer (OPT), Large Language Model Meta Artificial Intelligence (Llama), Big-science Large Open-science Open-access Multilingual (BLOOM) and Pathways Language Model (PaLM), possess the built-in ability to perform spatial-aware reading for visual documents. Spatial awareness refers to the understanding of the layout and positional information within a document, which is crucial for tasks like understanding diagrams, charts, tables, or extracting information from complex visual content. Although GPT4 has made advancements by introducing support for images and voices, it has not yet directly integrated spatial features for comprehending visual documents. For instance, ChatGPT's performance on the Document Visual Question Answering (DocVQA) task leaderboard, when fed with extracted text from documents, appears to be far from acceptable. From a less stringent perspective, ChatGPT has engaged with visual documents through causal learning, accommodating even disconnected fragments, without being constrained by spatial attributes.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic layout-aware generative module configured to perform spatial-aware reading for visual documents, but the disclosure is not limited thereto.

For example, the present disclosure, through one or more of its various aspects, embodiments, and/or specific features or sub-components, provides, among other features, various systems, servers, devices, methods, media, programs, and platforms for implementing a platform, language, cloud, and database agnostic layout-aware generative module configured to implement two primary enhancements: 1) disentangled spatial attention architecture and 2) an autoregressive block-infilling pretraining objective. By incorporating disentangled spatial attention, a generative model implemented by the layout-aware generative module may incrementally adapt the text semantics to spatial-aware multimodal semantics. Additionally, the introduction of autoregressive block-infilling in DocLLM effectively circumvents the problem of making disconnected next-token predictions, particularly among isolated fragments in sparse visual documents.

Moreover, the layout-aware generative module may be further configured to define a "block" as the most compact, cohesive unit, ensuring a continuous autoregressive learning process. And the layout-aware generative module may additionally be configured to incorporate the spatial feature without breaking the existing LLM architecture to adapt the semantics into spatial semantics., etc., but the disclosure is not limited thereto.

According to exemplary embodiments, a method for performing spatial-aware reading for visual documents by utilizing one or more processors along with allocated memory and a machine learning model is disclosed. The method may include: implementing a language model: modifying existing parameters and architecture of the language model to incorporate new parameters in its architecture by integrating a disentangled spatial attention process to the language model and outputting a modified model: pretraining the modified model by performing an autoregressive block infilling process on a plurality of document pages thereby training the new parameters and further adjusting the existing parameters and outputting a pretrained model: instruction-tuning the pretrained model on data derived from a plurality of visually rich document understanding datasets to teach the pretrained model to follow document-oriented instructions or answer questions about documents by leveraging their content and their spatial layout and outputting a trained model; and performing spatial-aware reading for visual documents by utilizing the trained model.

According to exemplary embodiments, the language model may be a generative large language model.

According to exemplary embodiments, in performing the instruction-tuning, the method may further include: fine-tuning the pretrained model with a plurality of visually rich document understanding datasets.

According to exemplary embodiments, in performing the spatial attention process, the method may further include: for a given document image of a document page, extracting each individual word, and corresponding block information, and the block's spatial attributes by applying an optical character recognition process, wherein a block is a compact unit of cohesive text segment that contains one or more individual words: constructing a spatial embedding representation by obtaining a two-dimensional block bounding box coordinates (x_0, y_0, x_1, y_1); and adding the embedding of one-dimensional position to a two-dimensional position embedding.

According to exemplary embodiments, the method may further include: incorporating, in response to adding the embedding, a disentangled spatial attention architecture into the model.

According to exemplary embodiments, the method may further include: encoding the coordinates of top left and bottom right corner of the block bounding box, wherein words inside a same block share a same bounding box.

According to exemplary embodiments, a block may be a compact unit of cohesive text segment that contains one or more individual words, and in performing the autoregressive block-infilling process, the method may further include: sampling k percent of blocks and replacing them with a block mask special token to obtain a corrupted document: forming an infill part with the sampled blocks by incorporating a start token with corresponding position embeddings; and permuting, in response to forming the infill part, order the sampled blocks.

According to exemplary embodiments, the method may further include: shifting and aligning an output with respect to infill part by incorporating the special token at the end of each block.

According to exemplary embodiments, a system for performing spatial-aware reading for visual documents is disclosed. The system may include: a processor; and a memory operatively connected to the processor via a communication interface, the memory storing computer readable instructions, when executed, may cause the processor to: implement a language model: modify existing parameters and architecture of the language model to incorporate new parameters in its architecture by integrating a disentangled spatial attention process to the language model and outputting a modified model: pretrain the modified model by performing an autoregressive block infilling process on a plurality of document pages thereby training the new parameters and further adjusting the existing parameters and outputting a pretrained model: instruction-tune the pretrained model on data derived from a plurality of visually rich document understanding datasets to teach the pretrained model to follow document-oriented instructions or answer questions about documents by leveraging their content and their spatial layout and outputting a trained model; and perform spatial-aware reading for visual documents by utilizing the trained model.

According to exemplary embodiments, in performing the instruction-tuning process, the processor may be further configured to: fine-tune the pretrained model with the plurality of visually rich document understanding datasets.

According to exemplary embodiments, in performing the spatial attention process, the processor may be further configured to: for a given document image of a document page, extract each individual word, and corresponding block information, and the block's spatial attributes by applying an optical character recognition process, wherein a block is a compact unit of cohesive text segment that contains one or more individual words: construct a spatial embedding representation by obtaining a two-dimensional block bounding box coordinates ($x\_0, y\_0, x\_1, y\_1$); and add the embedding of one-dimensional position to a two-dimensional position embedding.

According to exemplary embodiments, the processor may be further configured to: incorporate, in response to adding the embedding, a disentangled spatial attention architecture into the model.

According to exemplary embodiments, the processor may be further configured to: encode the coordinates of top left and bottom right corner of the block bounding box, wherein words inside a same block share a same bounding box.

According to exemplary embodiments, a block may be a compact unit of cohesive text segment that contains one or more individual words, and in performing the autoregressive block-infilling process, the processor may be further configured to: sample k percent of blocks and replace them with a block mask special token to obtain a corrupted document: form an infill part with the sampled blocks by incorporating a start token with corresponding position embeddings; and permute, in response to forming the infill part, order the sampled blocks.

According to exemplary embodiments, the processor may be further configured to: shift and align an output with respect to infill part by incorporating the special token at the end of each block.

According to exemplary embodiments, a non-transitory computer readable medium configured to store instructions for performing spatial-aware reading for visual documents is disclosed. The instructions, when executed, may cause a processor to perform the following: implementing a language model: modifying existing parameters and architecture of the language model to incorporate new parameters in its architecture by integrating a disentangled spatial attention process to the language model and outputting a modified model: pretraining the modified model by performing an autoregressive block infilling process on a plurality of document pages thereby training the new parameters and further adjusting the existing parameters and outputting a pretrained model: instruction-tuning the pretrained model on data derived from a plurality of visually rich document understanding datasets to teach the pretrained model to follow document-oriented instructions or answer questions about documents by leveraging their content and their spatial layout and outputting a trained model; and performing spatial-aware reading for visual documents by utilizing the trained model.

According to exemplary embodiments, in performing the instruction-tuning process, the instructions, when executed, may cause the processor to further perform the following: fine-tuning the pretrained model with the plurality of visually rich document understanding datasets.

According to exemplary embodiments, in performing the spatial attention process, the instructions, when executed, may cause the processor to further perform the following: for a given document image of a document page, extracting each individual word, and corresponding block information, and the block's spatial attributes by applying an optical character recognition process, wherein a block is a compact unit of cohesive text segment that contains one or more individual words: constructing a spatial embedding representation by obtaining a two-dimensional block bounding box coordinates ($x\_0, y\_0, x\_1, y\_1$); and adding the embedding of one-dimensional position to a two-dimensional position embedding.

According to exemplary embodiments, the instructions, when executed, may cause the processor to further perform the following: incorporating, in response to adding the embedding, a disentangled spatial attention architecture into the model.

According to exemplary embodiments, the instructions, when executed, may cause the processor to further perform the following: encoding the coordinates of top left and bottom right corner of the block bounding box, wherein words inside a same block share a same bounding box.

According to exemplary embodiments, a block may be a compact unit of cohesive text segment that contains one or more individual words, and in performing the autoregressive block-infilling process, the instructions, when executed, may cause the processor to further perform the following: sampling k percent of blocks and replacing them with a block mask special token to obtain a corrupted document: forming an infill part with the sampled blocks by incorporating a start token with corresponding position embeddings; and permuting, in response to forming the infill part, order the sampled blocks.

According to exemplary embodiments, the instructions, when executed, may cause the processor to further perform the following: shifting and aligning an output with respect to infill part by incorporating the special token at the end of each block.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
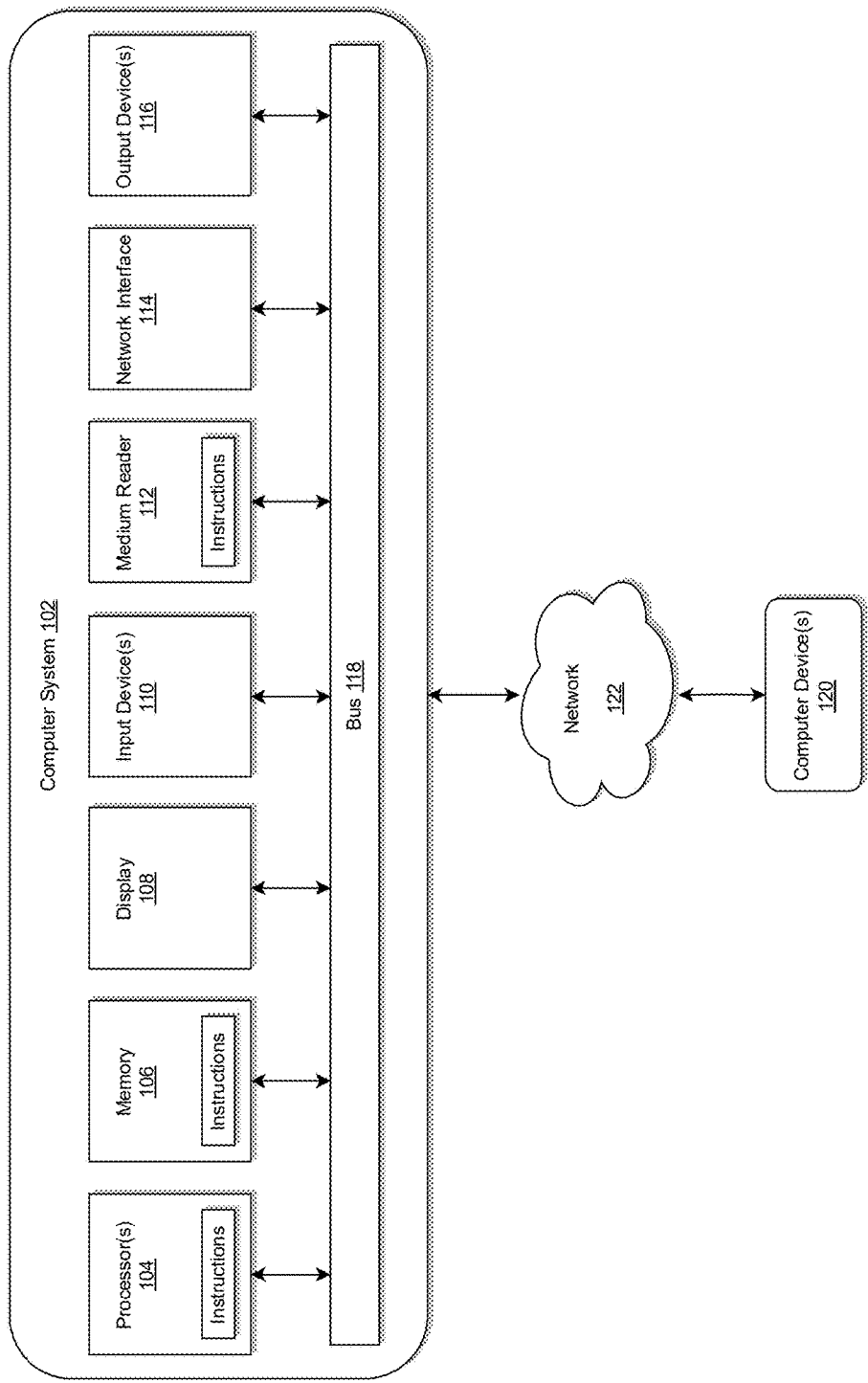
FIG. 1 illustrates a computer system for implementing a platform, language, database, and cloud agnostic layout-aware generative module configured to perform spatial-aware reading for visual documents in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic layout-aware generative module configured to perform spatial-aware reading for visual documents in accordance with an exemplary embodiment. The system 100 is generally shown and may include a computer system 102, which is generally indicated. According to exemplary embodiments, the layout-aware generative module and model can also run locally instead of cloud.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the layout-aware generative module implemented by the system 100 may be platform, language, database, and cloud agnostic that may allow for consistent easy orchestration and passing of data through various components to output a desired result regardless of platform, browser, language, database, and cloud environment. Since the disclosed process, according to exemplary embodiments, is platform, language, database, browser, and cloud agnostic, the layout-aware generative module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as xML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
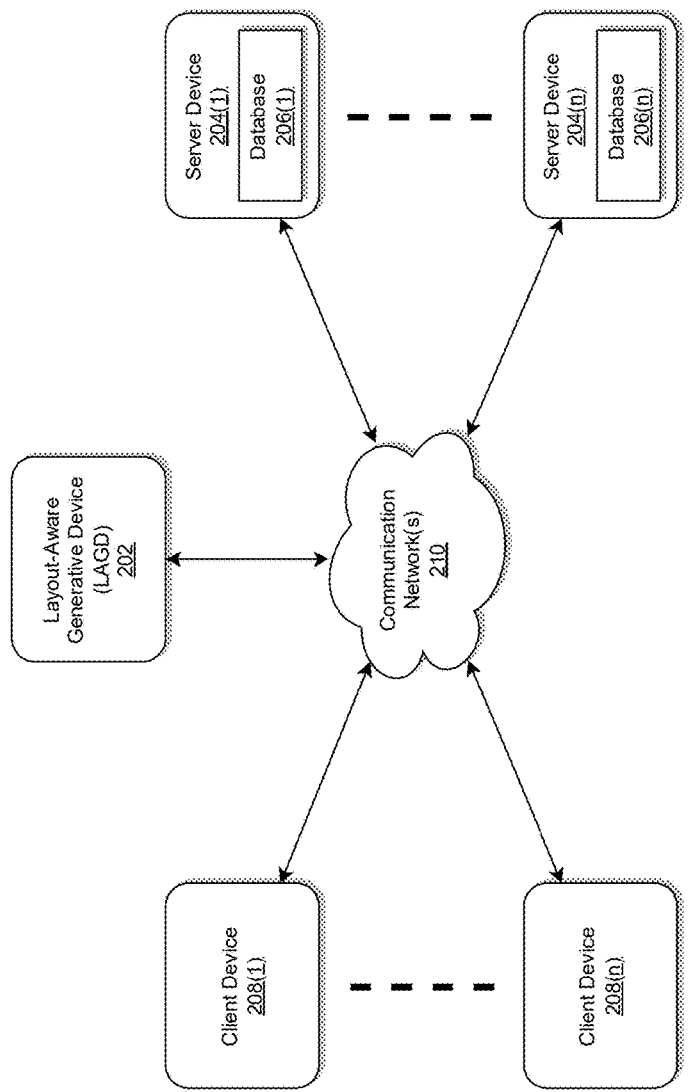
FIG. 2 illustrates an exemplary diagram of a network environment with a platform, language, database, and cloud agnostic layout-aware generative device in accordance with an exemplary embodiment.

Referring to FIG. 2, a schematic of an exemplary network environment 200 for implementing a language, platform, database, and cloud agnostic layout-aware generative device (LAGD) of the instant disclosure is illustrated.

According to exemplary embodiments, the above-described problems associated with conventional tools may be overcome by implementing an LAGD 202 as illustrated in FIG. 2 that may be configured for implementing a platform, language, database, and cloud agnostic layout-aware generative module configured to perform spatial-aware reading for visual documents, but the disclosure is not limited thereto.

The LAGD 202 may have one or more computer system 102, as described with respect to FIG. 1, which in aggregate provide the necessary functions.

The LAGD 202 may store one or more applications that can include executable instructions that, when executed by the LAGD 202, cause the LAGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LAGD 202 itself, may be located in virtual server(s) running in a cloud-based computing environment rather than being tied to one or more specific physical network computing devices. Also, the application(s) may be running in one or more virtual machines (VMs) executing on the LAGD 202. Additionally, in one or more embodiments of this technology, virtual machine(s) running on the LAGD 202 may be managed or supervised by a hypervisor.

In the network environment 200 of FIG. 2, the LAGD 202 is coupled to a plurality of server devices 204(1)-204(n) that hosts a plurality of databases 206(1)-206(n), and also to a plurality of client devices 208(1)-208(n) via communication network(s) 210. A communication interface of the LAGD 202, such as the network interface 114 of the computer system 102 of FIG. 1, operatively couples and communicates between the LAGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LAGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LAGD 202 may be a standalone device or integrated with one or more other devices or apparatuses, such as one or more of the server devices 204(1)-204(n), for example. In one particular example, the LAGD 202 may be hosted by one of the server devices 204(1)-204(n), and other arrangements are also possible. Moreover, one or more of the devices of the LAGD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LAGD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the LAGD 202 that may efficiently provide a platform for implementing a platform, language, database, and cloud agnostic layout-aware generative module configured to perform spatial-aware reading for visual documents, but the disclosure is not limited thereto.

The client devices 208(1)-208(n) may run interface applications, such as standard web browsers or standalone client applications, which may provide an interface to communicate with the LAGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the LAGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the LAGD 202, the server devices 204(1)-204(n), or the client devices 208(1)-208(n), for example, may be configured to operate as virtual instances on the same physical machine. For example, one or more of the LAGD 202, the server devices 204(1)-204(n), or the client devices 208(1)-208(n) may operate on the same physical device rather than as separate devices communicating through communication network(s) 210. Additionally, there may be more or fewer LAGDs 202, server devices 204(1)-204(n), or client devices 208(1)-208(n) than illustrated in FIG. 2. According to exemplary embodiments, the LAGD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
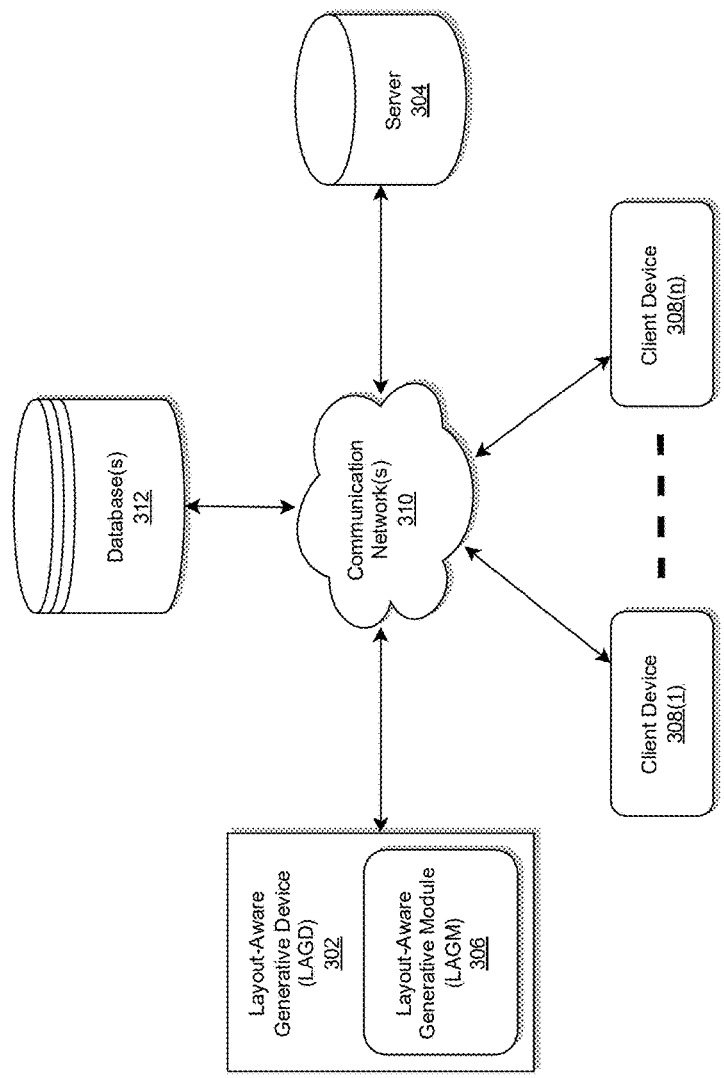
FIG. 3 illustrates a system diagram for implementing a platform, language, database, and cloud agnostic layout-aware generative device having a platform, language, database, and cloud agnostic layout-aware generative module in accordance with an exemplary embodiment.

FIG. 3 illustrates a system diagram for implementing a platform, language, and cloud agnostic LAGD having a platform, language, database, and cloud agnostic layout-aware generative module (LAGM) in accordance with an exemplary embodiment.

As illustrated in FIG. 3, the system 300 may include an LAGD 302 within which an LAGM 306 is embedded, a server 304, a database(s) 312, a plurality of client devices 308(1) . . . 308(n), and a communication network 310.

According to exemplary embodiments, the LAGD 302 including the LAGM 306 may be connected to the server 304, and the database(s) 312 via the communication network 310. The LAGD 302 may also be connected to the plurality of client devices 308(1) . . . 308(n) via the communication network 310, but the disclosure is not limited thereto. The database(s) 312 may include rule database.

According to exemplary embodiment, the LAGD 302 is described and shown in FIG. 3 as including the LAGM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

According to exemplary embodiments, the LAGM 306 may be configured to receive real-time feed of data from the plurality of client devices 308(1) . . . 308(n) and secondary sources via the communication network 310.

As may be described below, the LAGM 306 may be configured to: implement a language model: modify existing parameters and architecture of the language model to incorporate new parameters in its architecture by integrating a disentangled spatial attention process to the language model and outputting a modified model: pretrain the modified model by performing an autoregressive block infilling process on a plurality of document pages thereby training the new parameters and further adjusting the existing parameters and outputting a pretrained model: instruction-tune the pretrained model on data derived from a plurality of visually rich document understanding datasets to teach the pretrained model to follow document-oriented instructions or answer questions about documents by leveraging their content and their spatial layout and outputting a trained model; and perform spatial-aware reading for visual documents by utilizing the trained model, but the disclosure is not limited thereto.

The plurality of client devices 308(1) . . . 308(n) are illustrated as being in communication with the LAGD 302. In this regard, the plurality of client devices 308(1) . . . 308(n) may be "clients" (e.g., customers) of the LAGD 302 and are described herein as such. Nevertheless, it is to be known and understood that the plurality of client devices 308(1) . . . 308(n) need not necessarily be "clients" of the LAGD 302, or any entity described in association therewith herein. Any additional or alternative relationship may exist between either or both of the plurality of client devices 308(1) . . . 308(n) and the LAGD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the LAGD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The LAGD 302 may be the same or similar to the LAGD 202 as described with respect to FIG. 2, including any features or combination of features described with respect thereto.

Figure 4:
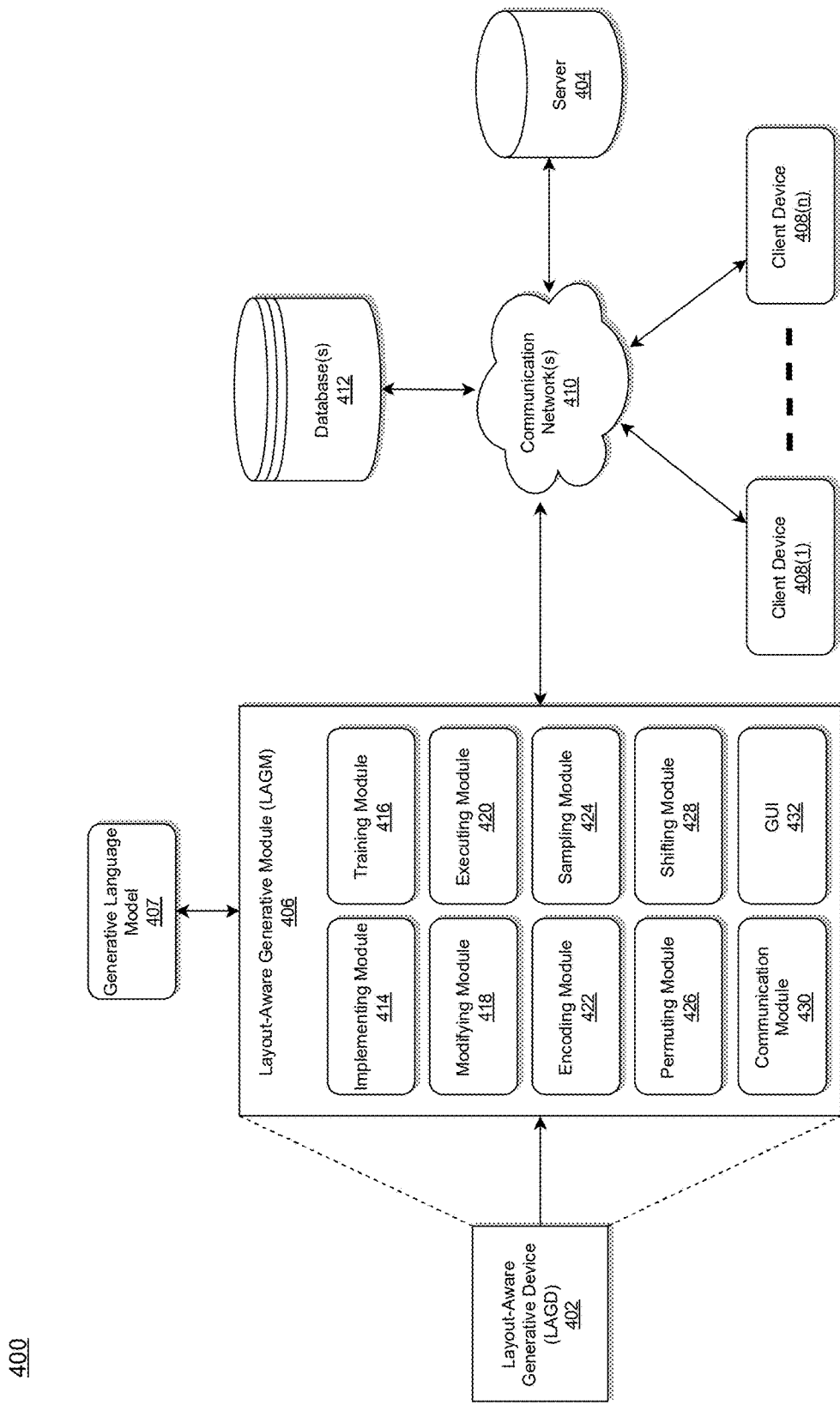
FIG. 4 illustrates a system diagram for implementing a platform, language, database, and cloud agnostic layout-aware generative module of FIG. 3 in accordance with an exemplary embodiment.

FIG. 4 illustrates a system diagram for implementing a platform, language, database, and cloud agnostic LAGM of FIG. 3 in accordance with an exemplary embodiment.

According to exemplary embodiments, the system 400 may include a platform, language, database, and cloud agnostic LAGD 402 within which a platform, language, database, and cloud agnostic LAGM 406 is embedded, a server 404, database(s) 412, a generative language model 407, and a communication network 410. According to exemplary embodiments, server 404 may comprise a plurality of servers located centrally or located in different locations, but the disclosure is not limited thereto.

According to exemplary embodiments, the generative language model 407 may be a generative large language model.

For example, the present disclosure, through one or more of its various aspects, embodiments, and/or specific features or sub-components, provides, among other features, various systems, servers, devices, methods, media, programs, and platforms for implementing the platform, language, cloud, and database agnostic LAGM 406 configured to implement two primary enhancements: 1) disentangled spatial attention architecture and 2) an autoregressive block-infilling pretraining objective. By incorporating disentangled spatial attention, the generative model implemented by LAGM 406 may incrementally adapt the text semantics to spatial-aware multi-modal semantics. Additionally, the introduction of autoregressive block-infilling in DocLLM effectively circumvents the problem of making disconnected next-token predictions, particularly among isolated fragments in sparse visual documents.

Moreover, the LAGM 406 may be further configured to define a "block" as the most compact, cohesive unit, ensuring a continuous autoregressive learning process. And the LAGM 406 may additionally be configured to incorporate the spatial feature without breaking the existing LLM architecture to adapt the semantics into spatial semantics., etc., but the disclosure is not limited thereto.

According to exemplary embodiments, the LAGD 402 including the LAGM 406 may be connected to the server 404, the generative language model 407, and the database(s) 412 via the communication network 410. The LAGD 402 may also be connected to the plurality of client devices 408(1)-408(n) via the communication network 410, but the disclosure is not limited thereto. The LAGM 406, the server 404, the plurality of client devices 408(1)-408(n), the database(s) 412, the communication network 410 as illustrated in FIG. 4 may be the same or similar to the LAGM 306, the server 304, the plurality of client devices 308(1)-308(n), the database(s) 312, the communication network 310, respectively, as illustrated in FIG. 3.

According to exemplary embodiments, the generative language model 7 may include one or more of the following large language models: ChatGPT, GPT4, OPT, Llama, BLOOM, PaLM, etc., but the disclosure is not limited thereto.

Details of the LAGM 406 is provided below with corresponding modules that may be configured to, in combination, results in executing disentangled spatial attention architecture and an autoregressive block-infilling pretraining objective for performing spatial-aware reading for visual documents.

According to exemplary embodiments, as illustrated in FIG. 4, the LAGM 406 may include an implementing module 414, a training module 416, a modifying module 418, an executing module 420, an encoding module 422, a sampling module 424, a permuting module 426, a shifting module 428, a communication module 430, and a graphical user interface (GUI) 432. According to exemplary embodiments, interactions and data exchange among these modules included in the LAGM 406 provide the advantageous effects of the disclosed invention. Functionalities of each module of FIG. 4 may be described in detail below with reference to FIGS. 4-9.

According to exemplary embodiments, each of the implementing module 414, training module 416, modifying module 418, executing module 420, encoding module 422, sampling module 424, permuting module 426, shifting module 428, and the communication module 430 of the LAGM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the implementing module 414, training module 416, modifying module 418, executing module 420, encoding module 422, sampling module 424, permuting module 426, shifting module 428, and the communication module 430 of the LAGM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the implementing module 414, training module 416, modifying module 418, executing module 420, encoding module 422, sampling module 424, permuting module 426, shifting module 428, and the communication module 430 of the LAGM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the LAGM 406 of FIG. 4 may also be implemented by Cloud based deployment.

According to exemplary embodiments, each of the implementing module 414, training module 416, modifying module 418, executing module 420, encoding module 422, sampling module 424, permuting module 426, shifting module 428, and the communication module 430 of the LAGM 406 of FIG. 4 may be called via corresponding API, but the disclosure is not limited thereto.

According to exemplary embodiments, the process implemented by the LAGM 406 may be executed via the communication module 430 and the communication network 410, which may comprise plural networks as described above. For example, in an exemplary embodiment, the various components of the LAGM 406 may communicate with the server 404, and the database(s) 412 via the communication module 430 and the communication network 410 and the results (i.e., pretrained model, trained model, generated graph, etc.) may be displayed onto the GUI 432. Of course, these embodiments are merely exemplary and are not limiting or exhaustive. The database(s) 412 may include the databases included within the private cloud and/or public cloud and the server 404 may include one or more servers within the private cloud and the public cloud. According to exemplary embodiments, the LAGM 406 and the generative language model 407 may run locally instead of cloud.

Figure 5:
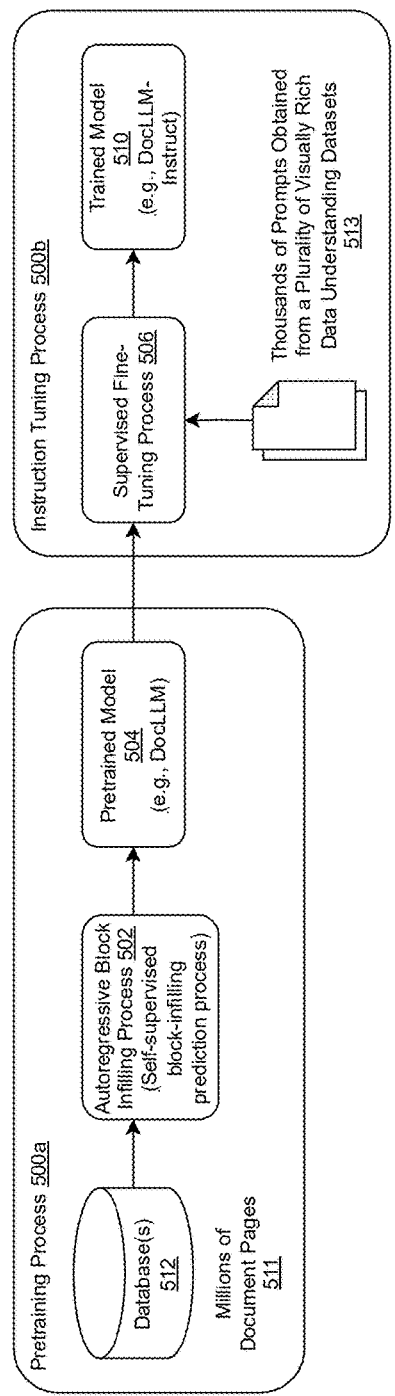
FIG. 5 illustrates an exemplary training workflow implemented by the platform, language, database, and cloud agnostic layout-aware generative module of FIG. 4 in accordance with an exemplary embodiment.

FIG. 5 illustrates an exemplary training workflow 500 implemented by the platform, language, database, and cloud agnostic LAGM 406 of FIG. 4 in accordance with an exemplary embodiment. As illustrated in FIG. 5, the exemplary training workflow 500 includes a pretraining process 500a and an instruction-tuning process 500b.

Referring back to FIGS. 4 and 5, according to exemplary embodiments, the implementing module 414 may be configured to implement a generative language model 407. The training module 416 may be configured to train the generative language model 407 by performing a pretraining process 500a and an instruction-tuning process 500b and output a trained model 510 (i.e., DocLLM-instruct), but the disclosure is not limited thereto).

According to exemplary embodiments, the pretraining process 500a includes pretraining the generative language model 407 with a plurality of visual document pages by performing an autoregressive block infilling process 502 and outputting a pretrained model 504 (i.e., DocLLM). The plurality of visual document pages may include millions of document pages (i.e., more than ten million) 511 obtained from various data sources (i.e., database(s) 512), but the disclosure is not limited thereto. The autoregressive block infilling process 502 may also be referred to as self-supervised block-infilling prediction process.

According to exemplary embodiments, in performing the instruction-tuning process 500b, the LAGM 406 may be configured to fine-tune the pretrained model 504 with a plurality of visually rich document understanding datasets. The plurality of visually rich document understanding datasets may include thousands of instructions bases prompts (i.e., more than nine hundred thousand prompts) 513 receiving via the GUI 432, but the disclosure is not limited thereto. For downstream tasks, the instruction-tuning process 500b adopts the answer-infilling formulation by implementing a supervised fine-tuning process 506, followed by the pretrained model 504. Given an example of document, question, and answer, the instruction-tuning process 500b transforms the document into a sequence of tokens: <DocStart> Doc <docSEP> Question <StartInfill> where the <startInfill> special token is the start indicator of the answering part.

For example, according to exemplary embodiments, the modifying module 418 may be configured to modify existing parameters (i.e., weights) and architecture of the generative language model 407 to incorporate new parameters in its architecture by integrating a disentangled spatial attention process to the generative language model 407 and outputting a modified model. The training module 416 may be configured to pretrain the modified model by performing the autoregressive block infilling process 502 on a plurality of document pages (i.e., millions of document pages 511) thereby training the new parameters and further adjusting the existing parameters and outputting a pretrained model 504. The LAGM 406 may be further configured to instruction-tune the pretrained model 504 on data derived from the plurality of visually rich document understanding datasets 513 to teach the pretrained model 504 to follow document-oriented instructions or answer questions about documents by leveraging their content and their spatial layout and outputting a trained model 510; and perform spatial-aware reading for visual documents by utilizing the trained model 510.

Figure 6:
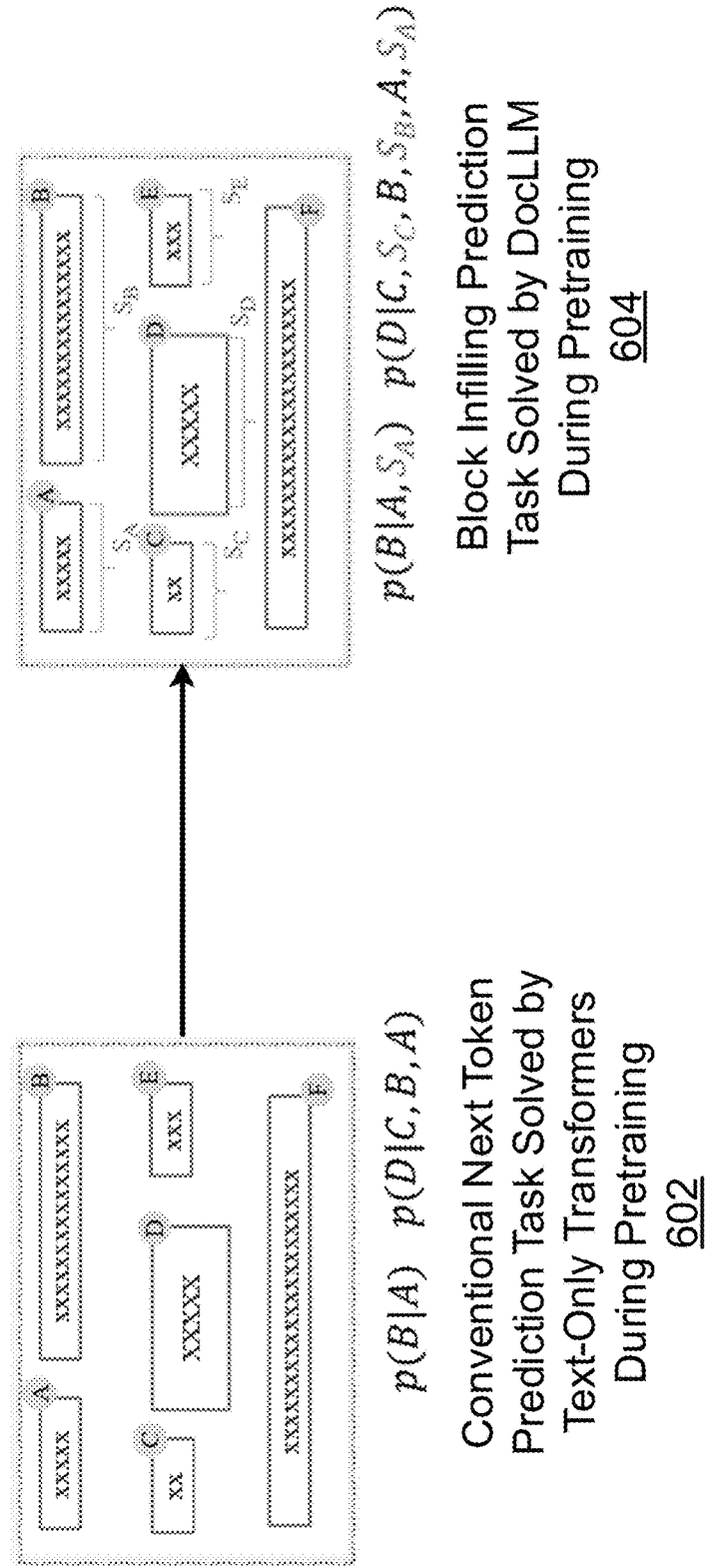
FIG. 6 illustrates an exemplary block infilling prediction process/task implemented by the platform, language, database, and cloud agnostic layout-aware generative module of FIG. 4 in accordance with an exemplary embodiment.

For example, FIG. 6 illustrates an exemplary block infilling prediction process/task 600 implemented by the LAGM 406 of FIG. 4 in accordance with an exemplary embodiment. FIG. 6 illustrates differences between a block-infilling prediction process/task and a next token prediction process/task. For example, as illustrated in FIG. 6, left side of this figure illustrates conventional next token prediction task solved by text-only transformers during pretraining 602. And right side of this figure illustrates block infilling prediction task solved by DocLLM during pretraining 604. SA. SB. Sc. and Sp correspond to the spatial tokens/coordinates that "encode" the location of the text in the blocks.

According to exemplary embodiments, in performing the spatial attention process (i.e., block infilling prediction process 600), the LAGM 406 may be configured to, for a given document image of a document page, extract each individual word, and corresponding block information, and the block's spatial attributes by applying an optical character recognition process. A block, according to exemplary embodiments, may be a compact unit of cohesive text segment that contains one or more individual words. The LAGM 406 then constructs a spatial embedding representation by obtaining a two-dimensional block bounding box coordinates (x_0, y_0, x_1, y_1); and adds the embedding of one-dimensional position to a two-dimensional position embedding.

According to exemplary embodiments, the LAGM 406 may be further configured to incorporate, in response to adding the embedding, a disentangled spatial attention architecture into the generative language model 407.

According to exemplary embodiments, the encoding module 422 may be configured to encode the coordinates of top left and bottom right corner of the block bounding box. Words inside the same block share the same bounding box.

Figure 7:
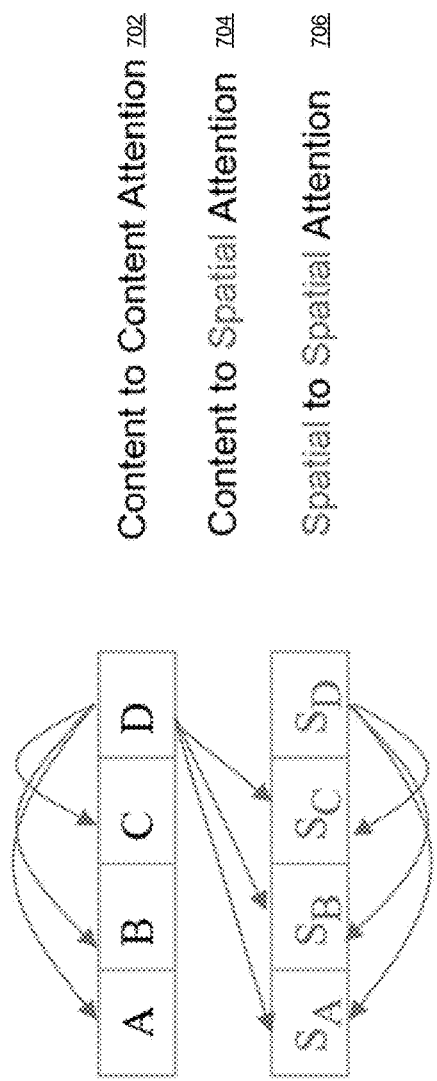
FIG. 7 illustrates an exemplary attention mode as implemented by the platform, language, database, and cloud agnostic layout-aware generative module of FIG. 4 in accordance with an exemplary embodiment.

For example, FIG. 7 illustrates an exemplary attention mode 700 as implemented by the LAGM 406 of FIG. 4 in accordance with an exemplary embodiment. As illustrated in FIG. 7, the exemplary attention mode 700 may include content to content attention 702, content to spatial attention 704, and spatial to spatial attention 706. Disentangled spatial attention process, according to exemplary embodiments, are explained below.

Let $x=(x_1, \ldots, x_i, \ldots, x_T)$ be and input sequence of length T, where $x_i$ is a text token. In classical transformers, the input tokens are first encoded into hidden vectors $H \in \mathbb{R}^{T \times d}$ using a learned embedding matrix based on the text vocabulary and a learned set of parameters for the token position in the sequence. A self-attention head then computes the attention scores between tokens i and j as $$Q^t = HW^{t,q} \quad K^t = HW^{t,k} \quad A_{i,j}^t = Q_i^t K_j^{tT} \quad (1)$$

where $W^q, W^k \in \mathbb{R}^{d \times d}$ are projection matrices and the superscript t is used to emphasize that these computations correspond to the text content. These attention scores $A \in \mathbb{R}^{T \times T}$ along with another projection matrix $W^v$ are further used to compute the hidden vectors used as inputs for subsequent layer H' as $$V^t = HW^{t,v} \quad H' = \text{softmax}\left(\frac{A^t}{\sqrt{d}}\right)V^t \quad (2)$$

According to exemplary embodiments, there is an additional bounding box input $b_i$=(left, top, right, bottom) corresponding to a text token, with $x=\{(x_i, b_i)\}_{i=1}^T$ now. The encoding module 422 (see FIG. 4) encodes the bounding boxes into hidden vectors $S \in \mathbb{R}^{T \times d}$ by introducing a trainable embedding matrix for projecting the layout information and learned parameters for the token position in the sequence. The LAGM 406 then decomposes the attention matrix computation into four different scores namely text-to-text, text-to-spatial, spatial-to-text, and spatial-to-spatial. Formally, $$Q^s = SW^{s,q} \quad K^s = SW^{s,k} \quad (3)$$

$$A_{ij} = Q_i^t K_j^{tT} + \beta_{t,s} Q_i^t K_j^{sT} + \beta_{s,t} Q_i^s K_j^{tT} + \beta_{s,s} Q_i^s K_j^{sT} \quad (4)$$

where $W^{s,q}, W^{s,k} \in \mathbb{R}^{d \times d}$ are newly introduced projection matrices corresponding to spatial modality and $\beta$ is a hyperparameter that controls the relative importance of each score. The input hidden vectors for the next layer H' are computed exactly as before. However, in contrast to equation (2), the newly calculated hidden vectors rely not only on the text semantics but also on the layout information of the text tokens.

Figure 8:
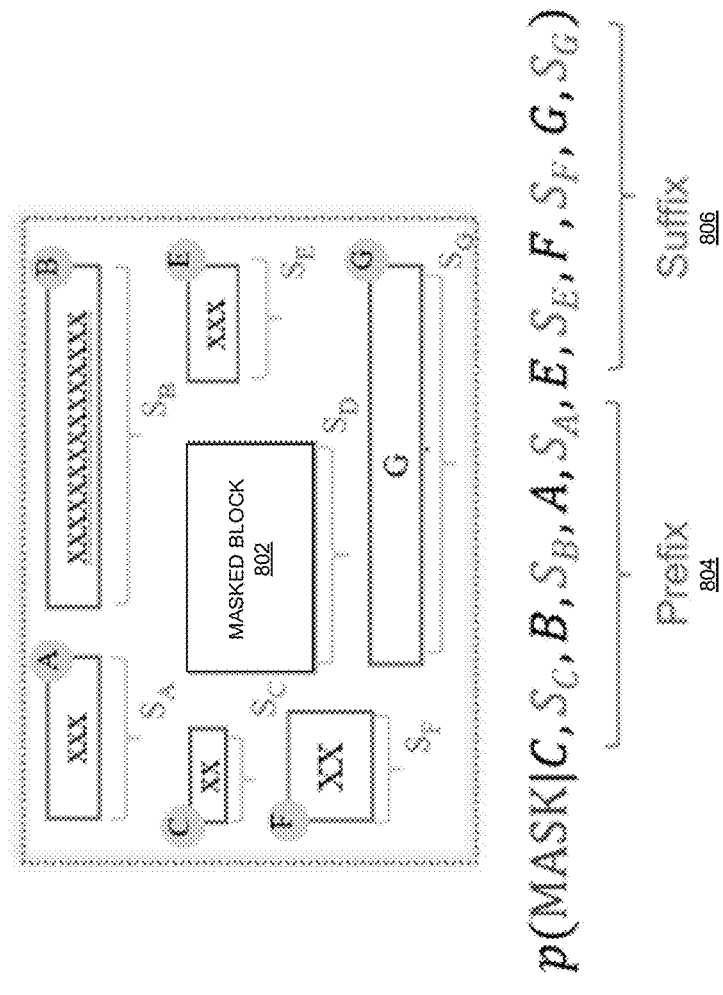
FIG. 8 illustrates an exemplary one masked block prediction process as implemented by the platform, language, database, and cloud agnostic layout-aware generative module of FIG. 4 in accordance with an exemplary embodiment.

FIG. 8 illustrates an exemplary one masked block prediction process 800 as implemented by the LAGM 406 of FIG. 4 in accordance with an exemplary embodiment.

As mentioned earlier, a block, according to exemplary embodiments, is the compact unit of cohesive text segment that contains one or more individual words, such as a heading or an address block. Most optical character recognition (OCR) engines identify text blocks using the spacing that separate them. For instance, Tesseract groups words into layout blocks and provides block-level information as part of its output. Tesseract provides a flag named page segmentation mode (psm) that can be set to identify the expected level of layout complexity. According to exemplary embodiments, the LAGM 406 utilizes psm=11 to maximize the identification of cohesive blocks, but the disclosure is not limited thereto. This setting allows Tesseract to identify text blocks without making many assumptions about the expected layout of the document.

One masked block prediction process 800 is shown in FIG. 8. However, the LAGM 406 may be configured to perform block infilling for multiple masked blocks as follows.

According to exemplary embodiments, in performing the autoregressive block-infilling process, the sampling module 424 may be configured to sample k percent of blocks and replace them with a block mask special token to obtain a corrupted document. The LAGM 406 then forms an infill part with the sampled blocks by incorporating a start token with corresponding position embeddings. The permuting module 426 may be configured to permute, in response to forming the infill part, order the sampled blocks.

As illustrated in FIG. 8, in the one masked block prediction process 800, an exemplary one masked block 802 may include a prefix 804 and a suffix 806. With reference to FIGS. 6 and 7, the prefix 804 may include C, Sc, B, SB, A, SA. And the suffix 806 may include E, SE, F, SF, G, SG.

According to exemplary embodiments, the shifting module 428 may be configured to shift and align an output with respect to infill part by incorporating the special token at the end of each block. For example, the shifting module 428 shifts and aligns the output y or infillPart' with respect to infillPart by incorporating special tokens <eos> at the end of each block, resulting in y=[b1, <eos>, b2 ... <eos>, bk]. The results are shown in FIG. 8.

Figure 9:
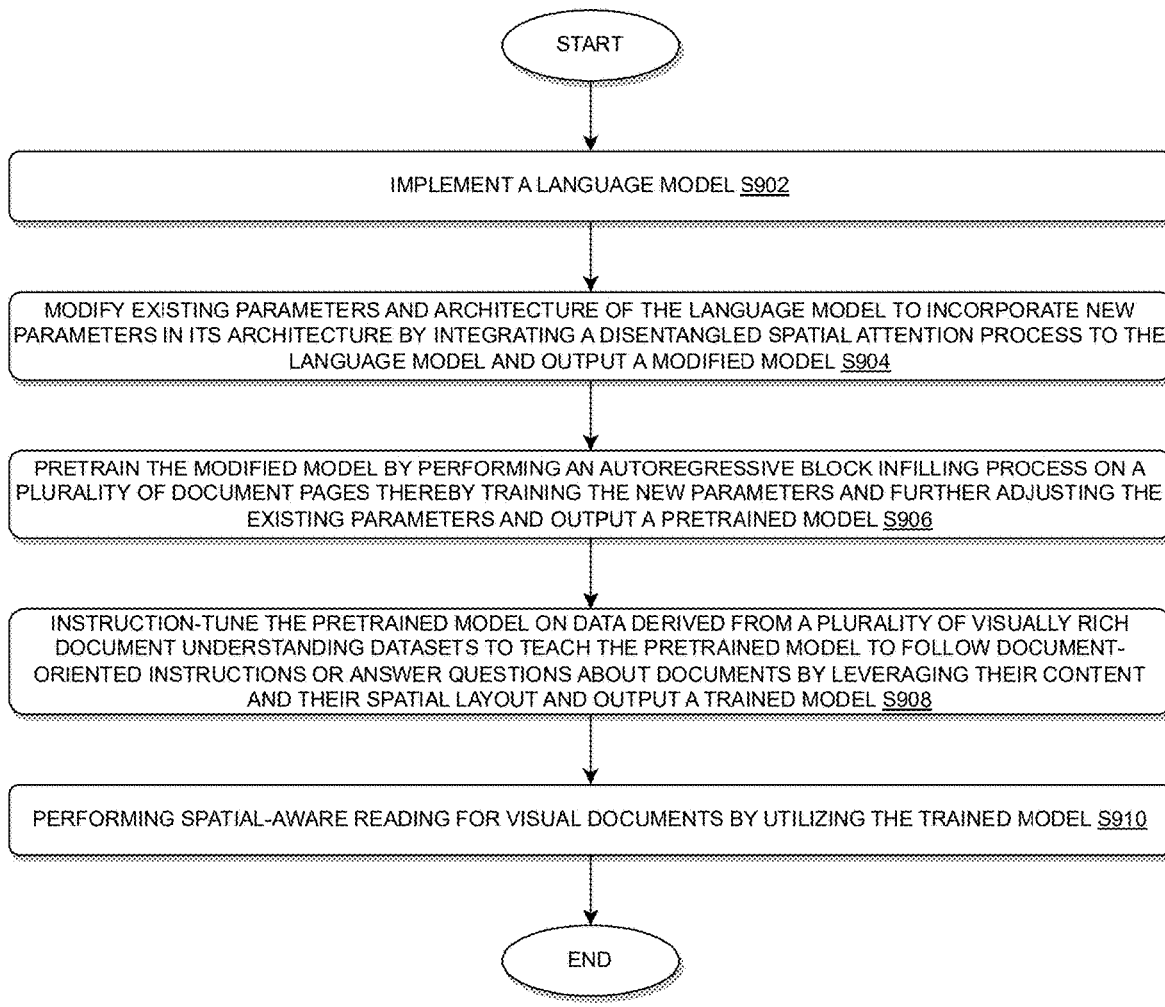
FIG. 9 illustrates an exemplary flow diagram of a process as implemented by the platform, language, database, and cloud agnostic layout-aware generative module of FIG. 4 for performing spatial-aware reading for visual documents in accordance with an exemplary embodiment.

FIG. 9 illustrates an exemplary flow diagram of a process 900 as implemented by the LAGM 406 of FIG. 4 for performing spatial-aware reading for visual documents in accordance with an exemplary embodiment. It will be appreciated that the illustrated process 900 and associated steps may be performed in a different order, with illustrated steps omitted, with additional steps added, or with a combination of reordered, combined, omitted, or additional steps.

As illustrated in FIG. 9, at step S902, the process 900 may include implementing a generative language model.

At step S904, the process 900 may include modifying existing parameters and architecture of the language model to incorporate new parameters in its architecture by integrating a disentangled spatial attention process to the language model and outputting a modified model.

At step S906, the process 900 may include pretraining the modified model by performing an autoregressive block infilling process on a plurality of document pages thereby training the new parameters and further adjusting the existing parameters and outputting a pretrained model.

At step S908, the process 900 may include instruction-tuning the pretrained model on data derived from a plurality of visually rich document understanding datasets to teach the pretrained model to follow document-oriented instructions or answer questions about documents by leveraging their content and their spatial layout and outputting a trained model.

At step S910, the process 900 may include performing spatial-aware reading for visual documents by utilizing the trained model.

According to exemplary embodiments, in performing the instruction-tuning process, the process 900 may further include: fine-tuning the pretrained model with the plurality of visually rich document understanding datasets.

According to exemplary embodiments, in performing the spatial attention process, the process 900 may further include: for a given document image of a document page, extracting each individual word, and corresponding block information, and the block's spatial attributes by applying an optical character recognition process, wherein a block is a compact unit of cohesive text segment that contains one or more individual words: constructing a spatial embedding representation by obtaining a two-dimensional block bounding box coordinates (x_0, y_0, x_1, y_1); and adding the embedding of one-dimensional position to a two-dimensional position embedding.

According to exemplary embodiments, the process 900 may further include: incorporating, in response to adding the embedding, a disentangled spatial attention architecture into the model.

According to exemplary embodiments, the process 900 may further include: encoding the coordinates of top left and bottom right corner of the block bounding box, wherein words inside a same block share a same bounding box.

According to exemplary embodiments, a block may be a compact unit of cohesive text segment that contains one or more individual words, and in performing the autoregressive block-infilling process, the process 900 may further include: sampling k percent of blocks and replacing them with a block mask special token to obtain a corrupted document: forming an infill part with the sampled blocks by incorporating a start token with corresponding position embeddings; and permuting, in response to forming the infill part, order the sampled blocks.

According to exemplary embodiments, the process 900 may further include: shifting and aligning an output with respect to infill part by incorporating the special token at the end of each block.

According to exemplary embodiments, the LAGD 402 may include a memory (e.g., a memory 106 as illustrated in FIG. 1) which may be a non-transitory computer readable medium that may be configured to store instructions for implementing a platform, language, database, and cloud agnostic LAGM 406 for automatically and dynamically performing spatial-aware reading for visual documents as disclosed herein. The LAGD 402 may also include a medium reader (e.g., a medium reader 112 as illustrated in FIG. 1) which may be configured to read any one or more sets of instructions, e.g., software, from any of the memories described herein. The instructions, when executed by a processor embedded within the LAGM 406 or within the LAGD 402, may be used to perform one or more of the methods and processes as described herein. In a particular embodiment, the instructions may reside completely, or at least partially, within the memory 106, the medium reader 112, and/or the processor 104 (see FIG. 1) during execution by the LAGD 402.

According to exemplary embodiments, the instructions, when executed, may cause a processor embedded within the LAGM 406 or the LAGD 402 to perform the following: implementing a language model: modifying existing parameters and architecture of the language model to incorporate new parameters in its architecture by integrating a disentangled spatial attention process to the language model and outputting a modified model: pretraining the modified model by performing an autoregressive block infilling process on a plurality of document pages thereby training the new parameters and further adjusting the existing parameters and outputting a pretrained model: instruction-tuning the pretrained model on data derived from a plurality of visually rich document understanding datasets to teach the pretrained model to follow document-oriented instructions or answer questions about documents by leveraging their content and their spatial layout and outputting a trained model; and performing spatial-aware reading for visual documents by utilizing the trained model. According to exemplary embodiments, the processor may be the same or similar to the processor 104 as illustrated in FIG. 1 or the processor embedded within the LAGD 202, LAGD 302, LAGD 402, and LAGM 406 which is the same or similar to the processor 104.

According to exemplary embodiments, in performing the instruction-tuning process, the instructions, when executed, may cause the processor 104 to further perform the following: fine-tuning the pretrained model with the plurality of visually rich document understanding datasets.

According to exemplary embodiments, in performing the spatial attention process, the instructions, when executed, may cause the processor 104 to further perform the following: for a given document image of a document page, extracting each individual word, and corresponding block information, and the block's spatial attributes by applying an optical character recognition process, wherein a block is a compact unit of cohesive text segment that contains one or more individual words; constructing a spatial embedding representation by obtaining a two-dimensional block bounding box coordinates (x_0, y_0, x_1, y_1); and adding the embedding of one-dimensional position to a two-dimensional position embedding.

According to exemplary embodiments, the instructions, when executed, may cause the processor 104 to further perform the following: incorporating, in response to adding the embedding, the disentangled spatial attention architecture into the model.

According to exemplary embodiments, the instructions, when executed, may cause the processor 104 to further perform the following: encoding the coordinates of top left and bottom right corner of the block bounding box, wherein words inside a same block share a same bounding box.

According to exemplary embodiments, a block may be a compact unit of cohesive text segment that contains one or more individual words, and in performing the autoregressive block-infilling process, the instructions, when executed, may cause the processor 104 to further perform the following: sampling k percent of blocks and replacing them with a block mask special token to obtain a corrupted document: forming an infill part with the sampled blocks by incorporating a start token with corresponding position embeddings; and permuting, in response to forming the infill part, order the sampled blocks.

According to exemplary embodiments, the instructions, when executed, may cause the processor 104 to further perform the following: shifting and aligning an output with respect to infill part by incorporating the special token at the end of each block.

According to exemplary embodiments as disclosed above in FIGS. 1-9, technical improvements effected by the instant disclosure may include a platform for implementing a platform, language, database, and cloud agnostic layout-aware generative module configured to perform spatial-aware reading for visual documents, but the disclosure is not limited thereto. For example, according to exemplary embodiments as disclosed above in FIGS. 1-9, technical improvements effected by the instant disclosure may include a platform for implementing a platform, language, database, and cloud agnostic layout-aware generative module configured to implement two primary enhancements: 1) disentangled spatial attention architecture and 2) an autoregressive block-infilling pretraining objective. By incorporating disentangled spatial attention, a generative model implemented by the layout-aware generative module may incrementally adapt the text semantics to spatial-aware multimodal semantics. Additionally, the introduction of autoregressive block-infilling in DocLLM effectively circumvents the problem of making disconnected next-token predictions, particularly among isolated fragments in sparse visual documents.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed: rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing spatial-aware reading for visual documents by utilizing one or more processors along with allocated memory and a machine learning model, the method comprising:

implementing a language model;
modifying existing parameters and architecture of the language model to incorporate new parameters in its architecture by integrating a disentangled spatial attention process to the language model and outputting a modified model;
pretraining the modified model by performing an autoregressive block infilling process on a plurality of document pages thereby training the new parameters and further adjusting the existing parameters and outputting a pretrained model;
instruction-tuning the pretrained model on data derived from a plurality of visually rich document understanding datasets to teach the pretrained model to follow document-oriented instructions or answer questions about documents by leveraging their content and their spatial layout and outputting a trained model; and
performing spatial-aware reading for visual documents by utilizing the trained model,
wherein in performing the spatial attention process, the method further comprising:
for a given document image of a document page, extracting each individual word, and corresponding block information, and the block's spatial attributes by applying an optical character recognition process, wherein a block is a compact unit of cohesive text segment that contains one or more individual words;
constructing a spatial embedding representation by obtaining a two-dimensional block bounding box coordinates $(x\_0, y\_0, x\_1, y\_1)$; and
adding the embedding of one-dimensional position to a two-dimensional position embedding.

2. The method according to claim 1, wherein in performing the instruction-tuning, the method further comprising:
fine-tuning the pretrained model with the plurality of visually rich document understanding datasets.

3. The method according to claim 1, further comprising:
incorporating, in response to adding the embedding, a disentangled spatial attention architecture into the model.

4. The method according to claim 1, further comprising:
encoding the coordinates of top left and bottom right corner of the block bounding box, wherein words inside a same block share a same bounding box.

5. The method according to claim 1, wherein a block is a compact unit of cohesive text segment that contains one or more individual words, and in performing the autoregressive block-infilling process, the method further comprising:
sampling k percent of blocks and replacing them with a block mask special token to obtain a corrupted document;
forming an infill part with the sampled blocks by incorporating a start token with corresponding position embeddings; and
permuting, in response to forming the infill part, order the sampled blocks.

6. The method according to claim 5, further comprising:
shifting and aligning an output with respect to infill part by incorporating the special token at the end of each block.

7. A system for performing spatial-aware reading for visual documents, the system comprising:
a processor; and
a memory operatively connected to the processor via a communication interface, the memory storing computer readable instructions, when executed, causes the processor to:

implement a language model;
modify existing parameters and architecture of the language model to incorporate new parameters in its architecture by integrating a disentangled spatial attention process to the language model and outputting a modified model;
pretrain the modified model by performing an autoregressive block infilling process on a plurality of document pages thereby training the new parameters and further adjusting the existing parameters and outputting a pretrained model;
instruction-tune the pretrained model on data derived from a plurality of visually rich document understanding datasets to teach the pretrained model to follow document-oriented instructions or answer questions about documents by leveraging their content and their spatial layout and outputting a trained model; and
perform spatial-aware reading for visual documents by utilizing the trained model,
wherein in performing the spatial attention process, the processor is further configured to:
for a given document image of a document page, extract each individual word, and corresponding block information, and the block's spatial attributes by applying an optical character recognition process, wherein a block is a compact unit of cohesive text segment that contains one or more individual words;
construct a spatial embedding representation by obtaining a two-dimensional block bounding box coordinates $(x\_0, y\_0, x\_1, y\_1)$; and
add the embedding of one-dimensional position to a two-dimensional position embedding.

8. The system according to claim 7, in performing the instruction-tune, the processor is further configured to:
fine-tune the pretrained model with the plurality of visually rich document understanding datasets.

9. The system according to claim 7, wherein the processor is further configured to:
incorporate, in response to adding the embedding, a disentangled spatial attention architecture into the model.

10. The system according to claim 7, wherein the processor is further configured to:
encode the coordinates of top left and bottom right corner of the block bounding box, wherein words inside a same block share a same bounding box.

11. The system according to claim 7, wherein a block is a compact unit of cohesive text segment that contains one or more individual words, and in performing the autoregressive block-infilling process, the processor is further configured to:
sample k percent of blocks and replace them with a block mask special token to obtain a corrupted document;
form an infill part with the sampled blocks by incorporating a start token with corresponding position embeddings; and
permute, in response to forming the infill part, order the sampled blocks.

12. The system according to claim 11, wherein the processor is further configured to:
shift and align an output with respect to infill part by incorporating the special token at the end of each block.

13. A non-transitory computer readable medium configured to store instructions for performing spatial-aware reading for visual documents, the instructions, when executed, cause a processor to perform the following:

implementing a language model;

modifying existing parameters and architecture of the language model to incorporate new parameters in its architecture by integrating a disentangled spatial attention process to the language model and outputting a modified model;

pretraining the modified model by performing an autoregressive block infilling process on a plurality of document pages thereby training the new parameters and further adjusting the existing parameters and outputting a pretrained model;

instruction-tuning the pretrained model on data derived from a plurality of visually rich document understanding datasets to teach the pretrained model to follow document-oriented instructions or answer questions about documents by leveraging their content and their spatial layout and outputting a trained model; and performing spatial-aware reading for visual documents by utilizing the trained model, wherein in performing the spatial attention process, the instructions, when executed, cause the processor to further perform the following:

for a given document image of a document page, extracting each individual word, and corresponding block information, and the block's spatial attributes by applying an optical character recognition process, wherein a block is a compact unit of cohesive text segment that contains one or more individual words;

constructing a spatial embedding representation by obtaining a two-dimensional block bounding box coordinates (x_0, y_0, x_1, y_1); and adding the embedding of one-dimensional position to a two-dimensional position embedding.

14. The non-transitory computer readable medium according to claim 13, in performing the instruction-tuning, the instructions, when executed, cause the processor to further perform the following:

fine-tuning the pretrained model with the plurality of visually rich document understanding datasets.

15. The non-transitory computer readable medium according to claim 13, wherein the instructions, when executed, cause the processor to further perform the following:

incorporating, in response to adding the embedding, a disentangled spatial attention architecture into the model.

16. The non-transitory computer readable medium according to claim 13, wherein the instructions, when executed, cause the processor to further perform the following:

encoding the coordinates of top left and bottom right corner of the block bounding box, wherein words inside a same block share a same bounding box.

17. The non-transitory computer readable medium according to claim 13, wherein a block is a compact unit of cohesive text segment that contains one or more individual words, and in performing the autoregressive block-infilling process, the instructions, when executed, cause the processor to further perform the following:

sampling k percent of blocks and replacing them with a block mask special token to obtain a corrupted document;

forming an infill part with the sampled blocks by incorporating a start token with corresponding position embeddings;

permuting, in response to forming the infill part, order the sampled blocks; and shifting and aligning an output with respect to infill part by incorporating the special token at the end of each block.

* * * * *